United States Patent
Benton

(10) Patent No.: US 8,114,266 B2
(45) Date of Patent: Feb. 14, 2012

(54) $CO_2$ DESTRUCTION BY GALVANIC CELL FUSION

(75) Inventor: John Edward Benton, Columbia, MO (US)

(73) Assignees: John Benton, Columbia, MO (US); Pam Fleenor, Columbia, MO (US)

( * ) Notice: Subject to any disclaimer, the term of this patent is extended or adjusted under 35 U.S.C. 154(b) by 0 days.

(21) Appl. No.: 12/930,414

(22) Filed: Jan. 6, 2011

(65) Prior Publication Data

US 2011/0100836 A1 May 5, 2011

Related U.S. Application Data

(60) Provisional application No. 61/336,344, filed on Jan. 21, 2010.

(51) Int. Cl.
*C25B 1/02* (2006.01)
(52) U.S. Cl. .......................... 205/657; 205/633
(58) Field of Classification Search ................ 205/633, 205/657
See application file for complete search history.

(56) References Cited

U.S. PATENT DOCUMENTS

2009/0169452 A1 * 7/2009 Constantz et al. ............ 423/230

FOREIGN PATENT DOCUMENTS

JP 11140592 A * 5/1999

OTHER PUBLICATIONS

Jones, "Principles and Prevention of Corrosion," 1996, Prentice-Hall, 2nd edition, pp. 435-436.*

* cited by examiner

*Primary Examiner* — Alexa D. Neckel
*Assistant Examiner* — Nicholas A. Smith

(57) ABSTRACT

Basically, I want to use soft, shredded, rusty metal as a sacrificial anode to $CO_2$ and $H_2SO_4$. The metal is then grounded by an earth ground. The sulfuric acid (powder/gas) will increase the conductivity of a Galvanic Cell/Battery (Rust) and conscript oxygen to do so. The galvanic cell itself (Rust) also conscripts oxygen in its attraction to less noble and dissimilar materials (ferrous metal) and will be forced to do work in the galvanic cell. As oxygen is conducted between the difference of two potentials (Battery/Galvanic Cell), sulfuric acid (a bond breaker) will both contribute to un-fusing oxygen from its carbon in the galvanic cell (Rust), and depositing that carbon onto the carbon-iron found in mild steel. Oxygen is released through its' "work" in the sacrificial anode (mild steel) during the rust process and binding the carbon both by acid deposition and electrolysis to the remaining iron and carbon of rust.

1 Claim, No Drawings

# CO₂ DESTRUCTION BY GALVANIC CELL FUSION

CROSS-REFERENCE TO RELATED APPLICATIONS

This application claims the benefit of my earlier filed provisional application, Ser. No. 61/336,344, filed on Jan. 21, 2010.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Criteria for Dealing With $CO_2$, $H_2SO_4$ and Mercury in Coal Fired Power Plants and Other $CO_2$ Emitting Exhaust Stacks (GOALS):
1. Low up front costs
2. Low replenishment costs
3. Minimum change to existing structure
4. Uses waste and or recycled materials
5. Little to no maintenance
6. Autonomous and automatic
7. Produces non-toxic waste; benign
8. No change in draft force needed
9. Extremely low energy to operate
10. Produces a waste of value
11. Environmentally friendly
12. Politically friendly
13. Easy to install inside or outside the stack
14. Safe to use and replenish
15. Easy to produce on site or by vendor
16. No water used
17. Destroy $CO_2$ and release Oxygen
18. Unaffected by soot, dust and particles
19. Takes advantage of $H_2SO_4$ soot, PH 2.5+−0.05
20. Takes advantage of 8 natural forces at plant
21. Combines proven plant techniques to destroy $CO_2$ releasing oxygen
22. Application lasts at least 2 duty cycles $5^{\wedge}1^{v}/5^{\wedge}1^{v}=12$ months before replenishment
23. Applying in stack has negligible to null affect on a power plant structure and operation.
24. Applying this technique will not interfere with normal plant operations.

BRIEF SUMMARY OF THE INVENTION

Basically, I want to use soft, shredded, rusty metal as a sacrificial anode to $CO_2$ and $H_2SO_4$. The metal is then grounded by an earth ground. The sulfuric acid (powder/gas) will increase the conductivity of a Galvanic Cell/Battery (Rust) and conscript oxygen to do so. The galvanic cell itself (Rust) also conscripts oxygen in its attraction to less noble and dissimilar materials (ferrous metal) and will be forced to do work in the galvanic cell. As oxygen is conducted between the difference of two potentials (Battery/Galvanic Cell), sulfuric acid (a bond breaker) will both contribute to un-fusing oxygen from its carbon in the galvanic cell (Rust), and depositing that carbon onto the carbon-iron used in mild steel. Oxygen is released through its' "work" in the sacrificial anode (mild steel) during the rust process and binding the carbon both by acid deposition and electrolysis to the remaining iron and carbon of rust.

A solution using our industry's own words.
A solution using our industry's own physics and chemistry.
Easily understood and maintained.
Uses no water.
Negligible electricity.
Destroys $CO_2$.
Releases oxygen.
Neutralizes sulfur.
Condenses and captures mercury.
Designed to use and easily incorporate recycled material.
Produces a waste of value.
Waste is dry, benign and easily handled.
Modifications to healthy stacks are straightforward.
For ailing stacks or greater effect, outbuildings dealing with smoke are straightforward.
Very low cost all the way around.
Coal of any quality may be used.
Doable now, by ordinary means.

BRIEF DESCRIPTION OF THE SEVERAL VIEWS OF THE DRAWING

Not Applicable

DETAILED DESCRIPTION OF THE INVENTION

The release of oxygen from $CO_2$ by galvanic cell fusion of carbon to ferrous carbon materials and the subsequent release of the oxygen bond from $CO_2$ in coal burning power plants and other $CO_2$ emitting exhaust stacks where grounded ferrous metals and/or ferrous minerals and/or compounds are offered as a sacrificial anode in $CO_2$ rich exhaust streams.

An open air circuit shall be made where the sacrificial anode is processed in such a way so that most grains are [1]"welded" and/or well conducted to a central conductor (copper, steel, stainless, etc.) where sections are connected by continuity ground couplings or a ground wire leading to a deep earth ground and/or ground increasing devices. The ferrous sacrificial anode material behaves as the hot wire that is grounded to earth (water table). Now with a ground and a hot wire the exhaust's mass and velocity itself provides the third part of an "open air circuit" by static charge energy inherent in hot stack exhaust.

This grounded, [1]"welded", ferrous material in the presence of $CO_2$ gases within the exhaust's mass flow static charge state, completes an open air circuit critical for optimal galvanic cell activity in sacrificial anode materials.

By providing a grounded, [1]"welded", sacrificial anode ferrous material to $CO_2$ in the exhaust stream (in the most attractive way) the oxygen bond is drawn to the galvanic cells by anode electrolytic attraction where the galvanic cell process fuses $CO_2$ carbon to ferrous materials carbon and releases oxygen. Noted also is the contribution sulfuric gas and acid (also bond destroyers), found inherently in coal burning exhaust, make to a galvanic cell by increasing the galvanic cell's conductivity and the active destruction of mineral bonds of ferrous material at its surface, thus increasing the galvanic cells anode electrolytic attraction of oxygen, thereby enhancing $CO_2$ destruction.

Oxidation is a secondary but important mechanism and contributes to galvanic cell activity helping to attract $CO_2$ to the galvanic cell.

The release of oxygen and the fusion of carbon is limited only by the sacrificial material's ferrous qualities, the [2]"state" it is in when introduced and its available ferrous bonds or the ferrous molarities of the materials. These variables are a means of controlling the rate of sacrificial material consumption as well as $CO_2$'s destruction to oxygen and carbon as relating to most power facilities maintenance cycles or demand cycles, etc. (Such as the Columbia Municipal Power Plant which runs 5 months, down 1 month, 5 months, down 1=12 month cycle. It is important that the sacrificial material, whatever recipe is used, last long enough in the exhaust stream for at least one cycle, however, there are many plant variables for cycles and sacrificial materials can be adapted to suit those cycles.)

In the event that the sacrificial material is too dry in the hot gases, steam lines can provide warm moisture to keep the galvanic cells as active as possible.

Envisioned also is the use of ferrous material sacrifice as a filter medium, barrier to or impedance of soot, dust and particulates that would otherwise clog, coat or impede the passage of $CO_2$ gas to other sequestration mediums such as Zeolite or membranes, etc.

Galvanic cell fusion of $CO_2$ carbon to ferrous carbon materials in an open air circuit can be placed throughout the exhaust stream and most likely hoisted in sections inside the exhaust stack.

Sacrificial anode ferrous materials could well produce a usable, refined material as its waste; such as pure iron or carbon black, etc.

Sacrificial anode ferrous material is widely adaptable and tunable to meet any $CO_2$ exhaust stream.

Adaptable to any shape and scale in the exhaust stream

Tunable to stay "effective" through at least one duty cycle for most power plants, i.e. five months before ferrous material replenishment and or replacement.

"Tunable" in composition for optimal $CO_2$ destruction as described. "Tunable" in composition to produce the most valuable waste from the $CO_2$ destruction by galvanic cell fusion.

1. "Welded" is taken literally and means ferrous material, i.e. grains, chips, dusts, powders, chunks, shreds, pellets and the like either from refined sources or unrefined sources or raw minerals, arc welded to, and/or have an overall conductivity to a central deep ground.

2. "State" refers to how clean the ferrous material is, such as grease, oil, coatings, etc. and also to what degree the ferrous material can be made more receptive to galvanic cell activity, $CO_2$ attraction, such as shredding, grinding, pellets, powders, etc.; formula, composition, compounds, metals, etc.; circuit conditioning devices, ground increasing devices, etc.

The invention claimed is:

1. A method of placing a sacrificial anode made of shredded, mild steel that is grounded inside a coal fired power plant smoke stack which reduces the amount of sulfur, carbon dioxide and mercury emitted into our environment.

* * * * *